US009920225B2

(12) United States Patent
Bogner et al.

(10) Patent No.: US 9,920,225 B2
(45) Date of Patent: Mar. 20, 2018

(54) VIBRATION DAMPING ADHESIVES

(71) Applicant: Avery Dennison Corporation, Glendale, CA (US)

(72) Inventors: Josh M. Bogner, Euclid, OH (US); Henry Milliman, Cleveland Heights, OH (US); Eric L. Bartholomew, Mill Hall, PA (US); Christopher L. Lester, Kingsport, TN (US)

(73) Assignee: Avery Dennison Corporation, Glendale, CA (US)

( * ) Notice: Subject to any disclaimer, the term of this patent is extended or adjusted under 35 U.S.C. 154(b) by 277 days.

(21) Appl. No.: 14/432,062

(22) PCT Filed: Sep. 25, 2013

(86) PCT No.: PCT/US2013/061697
§ 371 (c)(1),
(2) Date: Mar. 27, 2015

(87) PCT Pub. No.: WO2014/052463
PCT Pub. Date: Apr. 3, 2014

(65) Prior Publication Data
US 2015/0267088 A1    Sep. 24, 2015

Related U.S. Application Data

(60) Provisional application No. 61/706,169, filed on Sep. 27, 2012, provisional application No. 61/722,921, filed on Nov. 6, 2012.

(51) Int. Cl.
| | |
|---|---|
| *C09J 133/08* | (2006.01) |
| *C08F 220/18* | (2006.01) |
| *C09J 7/02* | (2006.01) |
| *G09F 3/10* | (2006.01) |

(52) U.S. Cl.
CPC .......... *C09J 133/08* (2013.01); *C08F 220/18* (2013.01); *C09J 7/0217* (2013.01); *G09F 3/10* (2013.01); *C09J 2203/334* (2013.01); *Y10T 156/10* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 3,193,049 A | 7/1965 | Wollek | |
| 4,045,517 A * | 8/1977 | Guerin | C08F 265/06 524/713 |
| 4,284,747 A | 8/1981 | Griffith et al. | |
| 5,063,098 A | 11/1991 | Niwa et al. | |
| 5,128,412 A * | 7/1992 | Miyasaka | C08F 8/14 525/108 |
| 5,230,701 A | 7/1993 | Meyer et al. | |
| 5,279,896 A | 1/1994 | Tokunaga et al. | |
| 5,351,940 A | 10/1994 | Yano et al. | |
| 5,464,659 A | 11/1995 | Melancon et al. | |
| 5,469,311 A | 11/1995 | Nishida et al. | |
| 5,712,038 A | 1/1998 | Yamazaki et al. | |
| 5,761,184 A | 6/1998 | Dauber et al. | |
| 5,856,022 A | 1/1999 | McCormick et al. | |
| 5,858,521 A | 1/1999 | Okuda et al. | |
| 5,914,855 A | 6/1999 | Gustafson et al. | |
| 6,594,114 B1 | 7/2003 | Suzuki et al. | |
| 6,636,378 B2 | 10/2003 | Tokunaga et al. | |
| 6,828,020 B2 | 12/2004 | Fisher et al. | |
| 6,878,775 B2 | 4/2005 | Husemann et al. | |
| 6,903,898 B2 | 6/2005 | Nonaka et al. | |
| 7,105,601 B2 | 9/2006 | Guo et al. | |
| 7,196,867 B2 | 3/2007 | Nonaka et al. | |
| 7,510,764 B2 | 3/2009 | Husemann et al. | |
| 7,534,478 B2 | 5/2009 | Nonaka et al. | |
| 2004/0097658 A1 * | 5/2004 | Everaerts | C08F 293/005 525/244 |
| 2005/0090592 A1 * | 4/2005 | Husemann | C08F 293/005 524/322 |
| 2008/0194759 A1 | 8/2008 | Casper | |
| 2009/0280322 A1 | 11/2009 | Daniels et al. | |
| 2009/0305068 A1 | 12/2009 | Morishita et al. | |
| 2011/0043737 A1 * | 2/2011 | Kim | C08L 33/08 349/122 |
| 2011/0236605 A1 * | 9/2011 | Hattori | C08G 18/6216 428/1.55 |

FOREIGN PATENT DOCUMENTS

| | | |
|---|---|---|
| CN | 1366676 | 8/2002 |
| CN | 2791815 Y | 6/2006 |
| CN | 101366676 A | 2/2009 |
| EP | 1278196 A1 | 1/2003 |
| JP | 8-259769 | 10/1996 |
| WO | WO2003078536 | 9/2003 |
| WO | WO2005035679 | 4/2005 |
| WO | WO2006110419 | 10/2006 |
| WO | WO 2014052463 A1 * | 4/2014 ............ C09J 133/08 |

OTHER PUBLICATIONS

Monica, Carfagni, "The Loss Factor As a Mesasure of Mechanical Damping", pp. 580-584, retrived on Mar. 10, 2017.*
ASTM D926-08 standard, "Standard Test Method for Rubber Property-Plasticity and Recovery (Parallel Plate Method)", pp. 1-4, retrived on Mar. 10, 2017.*
International Search Report and the Written Opinion of the International Searching Authority, or the Declaration, Jan. 16, 2014.
European Search Report prepared in corresponding European Appliction No. 17000119.2, dated May 2, 2017.

* cited by examiner

*Primary Examiner* — Anish P Desai
(74) *Attorney, Agent, or Firm* — Avery Dennison Corporation

(57) ABSTRACT

Adhesive compositions are described which are useful for damping vibration associated with hard disk drives. The adhesive compositions include a combination of at least two partially immiscible acrylic copolymers such that the compositions exhibit at least two distinct glass transition temperatures. Also described are label assemblies utilizing such adhesives and related methods of use.

10 Claims, No Drawings

VIBRATION DAMPING ADHESIVES

CROSS-REFERENCE TO RELATED APPLICATIONS

The present application is a 371 of International Application No. PCT/US2013/061697 which was published in English on Apr. 3, 2014 and claims priority from U.S. Provisional Application Nos. 61/706,169 filed Sep. 27, 2012 and 61/722,921 filed Nov. 6, 2012, all of which are incorporated herein by reference in their entireties.

FIELD

The present subject matter relates to vibration damping adhesives. In particular, the adhesives can be used in label assemblies adhered to hard disk drives for reducing vibration.

BACKGROUND

Computer systems generally include at least one or more disk drives for storage of information. Such disk drives are generally in the form of a sealed hard disk assembly chamber which includes one or more disks stacked on a spindle motor hub. The acoustic noise of a disk drive arises from the spindle motor and disks and from the moving actuator that supports the read/write heads. During operation of the disk drives, vibration at various frequencies also occurs as a result of the mechanical resonance of the various components of the sealed hard disk assembly. It is thus desirable to provide a strategy to damp vibration or sound resulting from operation of such devices.

SUMMARY

The difficulties and drawbacks associated with previous approaches are addressed in the present compositions, label assemblies, and methods.

In one aspect, the present subject matter provides a multiphase domain acrylic pressure sensitive adhesive exhibiting a high temperature peak damping functionality. The adhesive exhibits (i) a loss factor greater than 1.2 at a temperature of at least 100° F. (37.8° C.); and (ii) a shear modulus greater than 150 psi.

In another aspect, the present subject matter provides a label comprising a substrate defining a first face and an oppositely directed second face, and a layer of an adhesive disposed on at least one of the first face and the second face of the substrate. The adhesive exhibits (i) a loss factor greater than 1.2 at a temperature of at least 100° F. (37.8° C.); and (ii) a shear modulus greater than 150 psi.

In yet another aspect, the present subject matter provides a method for damping vibration from a hard disk drive. The method comprises providing a label including (i) a substrate defining a first face and an oppositely directed second face, and (ii) a layer of an adhesive disposed on at least one of the first face and the second face of the substrate. The adhesive exhibits (i) a loss factor greater than 1.2 at a temperature of at least 100° F. (37.8° C.); and (ii) a shear modulus greater than 150 psi. The method also comprises applying the label to the hard disk drive.

In still another aspect, the present subject matter provides a pressure sensitive adhesive comprising at least two acrylic copolymers which are at least partially immiscible relative to one another. The adhesive exhibits at least two distinct glass transition temperatures (Tg's), each corresponding to a respective copolymer. The adhesive also exhibits a loss factor of at least 1.0 at a temperature of at least 100° F. (37.8° C.).

In another aspect, the present subject matter provides a multiphase domain acrylic pressure sensitive adhesive exhibiting a high temperature peak damping functionality. The adhesive exhibits (i) a loss factor greater than 1.2 at a temperature of at least 100° F. (37.8° C.) and a frequency of about 1000 Hz; and (ii) a shear modulus greater than 150 psi at the noted temperature and frequency as measured by a Vibrating Beam Tester.

In another aspect, the present subject matter provides a label comprising a substrate defining a first face and an oppositely directed second face, and a layer of an adhesive disposed on at least one of the first face and the second face of the substrate. The adhesive exhibits (i) a loss factor greater than 1.2 at a temperature of at least 100° F. (37.8° C.) and a frequency of about 1000 Hz; and (ii) a shear modulus greater than 150 psi at the noted temperature and frequency as measured by a Vibrating Beam Tester.

In yet another aspect, the present subject matter provides a method for damping vibration from a hard disk drive. The method comprises providing a label including (i) a substrate defining a first face and an oppositely directed second face, and (ii) a layer of an adhesive disposed on at least one of the first face and the second face of the substrate. The adhesive exhibits (i) a loss factor greater than 1.2 at a temperature of at least 100° F. (37.8° C.) and a frequency of about 1000 Hz; and (ii) a shear modulus greater than 150 psi at the noted temperature and frequency as measured by a Vibrating Beam Tester. The method also comprises applying the label to the hard disk drive.

In still another aspect, the present subject matter provides a pressure sensitive adhesive comprising at least two acrylic copolymers which are at least partially immiscible relative to one another. The adhesive exhibits at least two distinct glass transition temperatures (Tg's), each corresponding to a respective copolymer. The adhesive also exhibits a loss factor of at least 1.0 at a temperature of at least 100° F. (37.8° C.) and a frequency of about 1000 Hz as measured by a Vibrating Beam Tester.

As will be realized, the subject matter described herein is capable of other and different embodiments and its several details are capable of modifications in various respects, all without departing from the claimed subject matter. Accordingly, the description is to be regarded as illustrative and not restrictive.

DETAILED DESCRIPTION OF THE EMBODIMENTS

Various pressure sensitive adhesives are provided. The adhesives are particularly useful in a label assembly that can be adhered to an outer face of a hard disk drive (HDD) housing. A thin layer of adhesive in the label assembly dampens or absorbs vibration such as that resulting from operation of the hard disk drive, which is typically in a range of 400 to 10,000 Hz, in certain embodiments from about 600 to about 2,000 Hz, and often from about 1,000 to about 2,000 Hz, and occurring at a temperature of about 60° to 160° F. (15.5° to 71.11° C.), and in certain embodiments from about 80° to 125° F. (37.8° to 51.7° C.).

The adhesives include a blend of two or more at least partially immiscible acrylic copolymers. Because the two or more copolymers are at least partially immiscible relative to one another, a blend for example of two copolymers exhibits two distinct glass transition temperatures (Tg's), each corresponding to a respective copolymer. The use of a combination of partially immiscible acrylic copolymers results in improved performance and greater range of use for the resulting adhesive.

One copolymer comprises from about 50 wt % to about 75 wt % butyl acrylate, from about 20 wt % to about 50 wt % methyl methacrylate, and from about 0.1 wt % to about 10 wt % acrylic acid. In certain versions of the adhesive composition, the copolymer includes 62 wt % butyl acrylate, 35 wt % methyl methacrylate, and 3 wt % acrylic acid.

Another copolymer includes from about 70 wt % to about 95 wt % butyl acrylate, from about 5 wt % to about 30 wt % methyl methacrylate, and from about 0.1 wt % to about 10 wt % acrylic acid. In certain versions of the adhesive composition, the copolymer includes 82 wt % butyl acrylate, 15 wt % methyl methacrylate, and 3 wt % acrylic acid.

It is also contemplated that instead of or in addition to butyl acrylate and/or methyl methacrylate, appropriate amounts of 2-ethyl hexyl acrylate and/or isooctyl acrylate could be used. It is also contemplated that appropriate amounts of vinyl acetate and/or ethyl acetate could be used in place of, or in addition to, one or more of the acrylate monomers forming the copolymer(s) of interest. Furthermore, it will be appreciated that instead of using methyl methacrylate in either or both of the copolymers of interest, appropriate amounts of methyl acrylate could be used. Moreover, any suitable ester of methacrylic acid could be used. Similarly, any suitable equivalent for butyl acrylate could potentially be used in the present subject matter adhesive compositions.

The two copolymers are blended with each other in a weight proportion of from about 5:95 to about 95:5. In certain versions, the adhesive includes the two copolymers blended at a weight proportion of from about 40:60 to about 60:40 with respect to each other.

Upon blending the two copolymers, an overall ratio of butyl acrylate to methyl methacrylate can be determined. In certain versions of the adhesive compositions, the total weight percent of butyl acrylate is from about 20% to about 80%, the total weight percent of methyl methacrylate is from about 40% to about 80%, and the total weight percent of acrylic acid is from about 0.1% to about 10%. Adjusting the ratio of butyl acrylate to methyl methacrylate (or methyl acrylate) enables selection of desired glass transition temperatures of the resulting adhesive composition which in turn enables balancing peak damping temperature while still achieving adequate adhesion and wet-out properties of the adhesive.

Although the adhesives are generally described as including a blend of two partially immiscible acrylic copolymers, it will be appreciated that the present subject matter includes the use of more than two such copolymers.

The various adhesive compositions can optionally include one or more ancillary components such as, but not limited to modifying resins, fillers, crosslinking agents, plasticizers, tackifiers, and other additives.

Blending of the acrylic copolymers and any additional components such as the modifying resin is performed by any method that results in a substantially homogeneous distribution of the acrylic copolymers and modifying resin for example in the coated adhesive. The blend can be prepared by solvent blending, hot melt blending, emulsifying, etc. In the case of solvent blending, the copolymers should be substantially soluble in the solvents used.

Any suitable solvent may be used to form the adhesive coating solution. Typical solvents include tetrahydrofuran, toluene, xylene, hexane, heptane, cyclohexane, cyclohexanone, methylene chloride, isopropanol, ethanol, ethyl acetate, butyl acetate, isopropyl acetate and the like.

Additives, such as pigments, fillers, ultraviolet light absorbers, ultraviolet stabilizers, antioxidants, plasticizers, tackifiers, fire retardant agents, thermally or electrically conductive agents, post curing agents, and the like may be blended into the adhesive composition to modify the properties of the adhesive. Ultraviolet light absorbers include hydroxyphenyl benzotriazoles and hydrobenzophenones. UV stabilizers are commonly hindered amine light stabilizers. Antioxidants include, for example, hindered phenols, amines, and sulfur and phosphorus hydroxide decomposers, such as Irganox 1520L. Typically, such additives are used in amounts of about 0.1 to about 30 parts per hundred parts of total solids.

Various release layers are available that may be applied to the adhesive and are useful in protecting the pressure sensitive adhesive from inadvertently bonding prior to use. Suitable release layers are described in some detail in Chapter 23 of the Handbook of Pressure Sensitive Adhesive Technology, 2d Ed., edited by Donatas Satas.

In one version of the proposed adhesive, a 50:50 blend of two copolymers A and B is provided. The composition of each copolymer is as follows:

TABLE 1

Composition of Blended Copolymers in Adhesive

| Copolymer | Butyl Acrylate | Methyl Methacrylate | Acrylic Acid |
|---|---|---|---|
| A | 62% | 35% | 3% |
| B | 82% | 15% | 3% |

As previously noted, certain adhesive compositions according to the present subject matter exhibit a particular combination of glass transition temperatures (Tg's). Generally, the adhesives exhibit at least two Tg values. A first Tg is from about 0° C. to about 100° C., and a second Tg is from about −50° C. to about 0° C. In one version of the subject matter, the adhesive composition exhibits a first Tg of about 17° C. and a second Tg of about −14° C. The first Tg of 17° C. is exhibited by a copolymer of 62% butyl acrylate, 35% methyl methacrylate, and 3% acrylic acid. The second Tg of −14° C. is exhibited by a copolymer of 82% butyl acrylate, 15% methyl methacrylate, and 3% acrylic acid. The various references to Tg values noted herein are determined by Dynamic Mechanical Analysis (DMA). The adhesives of the present subject matter exhibit at least two distinct Tg's as measured by DMA, but maintain properties of a miscible system of a pressure sensitive adhesive.

The adhesives of the present subject matter exhibit good damping performance across the audible spectrum which is generally considered as from 20 Hz to 20,000 Hz at temperatures within a range of from about 50° F. (10° C.) to about 150° F. (65.5° C.). Excellent damping performance occurs at temperatures of from 100° F. (37.8° C.) to 140° F. (60° C.) at frequencies within a range of from about 600 Hz to about 2,000 Hz, and in certain versions from about 1,000 Hz to about 2,000 Hz. The term "good damping" as used herein refers to damping greater than a loss factor of 1.0 at a temperature of at least 100° F. (37.8° C.) and about 1000 Hz as measured by a Vibrating Beam Tester as known in the art. The term "excellent damping" as used herein refers to damping such that a loss factor is greater than 1.2 at a temperature of at least 100° F. (37.8° C.) and about 1000 Hz as measured by a Vibrating Beam Tester as known in the art.

Such measurement is defined by ASTM E756, "Standard Test Method for Measuring Vibration Damping Properties of Materials."

In certain versions of the present adhesive composition, the adhesive composition exhibits a loss factor greater than 1.2 at a temperature of at least 100° F. (37.8° C.) and a frequency of about 1000 Hz; and (ii) a shear modulus greater than 150 psi at the noted temperature and frequency as measured by a Vibrating Beam Tester; while preserving WPI (Williams Plasticity Index) being less than 2.5 and/or Looptack being greater than 1.5 PLI (pounds per lineal inch) at ambient temperature, i.e. 72° F. (22.2° C.).

For many applications, the adhesive will exhibit a WPI value of less than 2.5 and typically about 2.4. However, the present subject matter includes adhesives that exhibit a WPI value less than 3.0 and in certain embodiments up to about 3.5.

In certain versions of the adhesive composition, the adhesive exhibits certain levels of outgassing such as about 10 μg/g or greater than 10 μg/g. In certain embodiments, typical outgassing levels are in a range of from about 15 μg/g to about 30 μg/g, and generally less than 40 μg/g.

Another advantage of the adhesives is that the adhesives exhibit a relatively low extent of outgassing. Thus, the adhesives can be used in numerous other applications within the electronics industry besides HDD components.

The copolymers used in the adhesive compositions of the present subject matter can be produced using a variety of techniques and processes. In certain aspects, the copolymers can be formed by techniques known in the art such as controlled architecture polymerization and/or by standard free radical polymerization.

The damping pressure sensitive adhesives can be used in various adhesive constructions such as label assemblies. For example, the adhesives can be applied to a substrate or carrier film. The carrier film may be a polymeric film, such as a polyester, polyethylene, polypropylene, polyurethane, or polyvinyl chloride film or multilayer film or blends of one or more of these. The substrate or carrier film can also be a release liner, or paper substrate. Substrates or carriers include, but are not limited to film form, felt, woven, knitted, non-woven, scrim, foamed, or cavitated. Other substrates include, but are not limited to, metal or foil such as aluminum, steel, and stainless steel, with or without a coating overlying the metal. The adhesive construction may be a transfer tape, single coated or double coated construction with one or two liners.

The present subject matter also provides various methods of use associated with the adhesive compositions and label assemblies utilizing such compositions. In one embodiment, a label assembly including an adhesive composition described herein is applied to a hard disk drive for which vibration or noise is to be dampened. Specifically, the label is adhesively applied by contacting an exposed face of a layer of the adhesive to the hard disk drive. Typically, the adhesive layer is contacted with an outer surface of an enclosure of a hard disk drive. And, in many applications, the label is applied directly upon the exterior of a hard disk drive enclosure or housing. Accordingly, the vibration reducing labels of the present subject matter may include various indicia and/or information as desired.

When incorporated in a label or other layered array, a typical thickness for the adhesive layer is from about 0.25 mil to about 5.0 mil, and in certain versions from about 0.25 mil to about 3.0 mil. However, it will be appreciated that the present subject matter includes a wide range of thicknesses for the adhesive layer(s). In addition, it is also contemplated that the adhesive layer(s) may be noncontinuous and/or patterned.

The present subject matter also provides label assemblies and other layered arrays utilizing multiple adhesives. For example, in one embodiment, a vibration damping adhesive is utilized in combination with a conventional or other commercially available adhesive. This strategy enables control of pressure sensitive properties of a first adhesive and control of vibration damping properties of a second adhesive. Furthermore, it is also contemplated that an overall composite adhesive system could be provided in which one adhesive exhibited multiple Tg's and another adhesive exhibited another or different Tg. In forming layered arrays using different adhesives utilizing different rheology characteristics of the adhesives could promote maintenance of distinct and/or different Tg's.

Test Methods

Loss factor values as described herein are determined by Vibrating Beam Tester (VBT), Dynamic Mechanical Analysis (DMA), Rotational Rheometry.

Shear modulus is determined by Vibrating Beam Tester (VBT), Dynamic Mechanical Analysis (DMA), Rotational Rheometry.

Vibrating Beam Tester (VBT) measurements are determined in accordance with Standard Test Method (ASTM E756).

Williams Plasticity Index (WPI) is determined by Standard Test Method (D926-56).

Looptack is determined by Standard Test Method (ASTM D6195).

Many other benefits will no doubt become apparent from future application and development of this technology.

All patents, published applications, standards, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A multiphase domain acrylic pressure sensitive adhesive, the adhesive exhibiting (i) a loss factor greater than 1.2 at a temperature of 100° F. (37.8° C.) and a frequency of about 1,000 Hz; and (ii) a shear modulus greater than 150 psi at said temperature and frequency;

the adhesive comprising at least two acrylic copolymers which are at least partially immiscible relative to one another, wherein the at least two acrylic copolymers include a first copolymer and a second copolymer, the adhesive exhibiting at least two distinct glass transition temperatures (Tg's), each corresponding to the first copolymer and the second copolymer, wherein the first copolymer exhibits a Tg of from about 0° C. to about 100° C., and the second copolymer exhibits a Tg of from about −50° C. to about 0° C.; and wherein the first copolymer comprises from about 50 wt % to about 75 wt % butyl acrylate, from about 20 wt % to about 50 wt % methyl acrylate, and from about 0.1 wt % to about 10 wt % acrylic acid, and wherein the second copolymer comprises from about 70 wt % to about 95 wt % butyl acrylate, from about 5 wt % to about 30 wt % methyl acrylate, and from about 0.1 wt % to about 10 wt % acrylic acid.

2. The adhesive of claim 1 wherein the first copolymer comprises 62 wt % butyl acrylate, 35 wt % methyl acrylate, and 3 wt % acrylic acid.

3. The adhesive of claim 1 wherein the second copolymer comprises 82 wt % butyl acrylate, 15 wt % methyl acrylate, and 3 wt % acrylic acid.

4. The adhesive of claim 1 wherein the at least two copolymers are present in the adhesive in a weight proportion of from about 5:95 to about 95:5.

5. The adhesive of claim 4 wherein the at least two copolymers are present in the adhesive in a weight proportion of from about 40:60 to about 60:40.

6. The adhesive of claim 1, wherein the total weight percent of the methyl acrylate in the first copolymer and the second copolymer is from about 40% to about 80%.

7. The adhesive of claim 1 wherein the first copolymer exhibits a Tg of about 17° C. and the second copolymer exhibits a Tg of about −14° C.

8. The adhesive of claim 1 wherein the adhesive exhibits pressure sensitive adhesive properties at ambient temperature characterized by a Williams Plasticity Index (WPI) less than 3.5.

9. The adhesive of claim 8 exhibiting a WPI less than 3.0.

10. The adhesive of claim 9 exhibiting a WPI less than 2.5.

\* \* \* \* \*